US011526936B2

(12) United States Patent
Song et al.

(10) Patent No.: US 11,526,936 B2
(45) Date of Patent: *Dec. 13, 2022

(54) GRAPHICAL STRUCTURE MODEL-BASED CREDIT RISK CONTROL

(71) Applicant: Advanced New Technologies Co., Ltd., Grand Cayman (KY)

(72) Inventors: Le Song, Hangzhou (CN); Hui Li, Hangzhou (CN); Zhibang Ge, Hangzhou (CN); Xin Huang, Hangzhou (CN); Chunyang Wen, Hangzhou (CN); Lin Wang, Hangzhou (CN); Tao Jiang, Hangzhou (CN); Yiguang Wang, Hangzhou (CN); Xiaofu Chang, Hangzhou (CN); Guanyin Zhu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 5 days.

This patent is subject to a terminal disclaimer.

(21) Appl. No.: 16/805,538

(22) Filed: Feb. 28, 2020

(65) Prior Publication Data
US 2020/0202428 A1   Jun. 25, 2020

Related U.S. Application Data (63) Continuation of application No. PCT/CN2018/110730, filed on Oct. 18, 2018.

(30) Foreign Application Priority Data

Dec. 15, 2017   (CN) .......................... 201711349800.4

(51) Int. Cl.
G06Q 40/02   (2012.01)
G06N 20/10   (2019.01)
(Continued)

(52) U.S. Cl.
CPC ......... *G06Q 40/025* (2013.01); *G06K 9/6256* (2013.01); *G06N 7/005* (2013.01); *G06N 20/10* (2019.01)

(58) Field of Classification Search
USPC .......................................... 705/38
See application file for complete search history.

(56) References Cited

U.S. PATENT DOCUMENTS 9,659,560 B2 *   5/2017   Cao ........................... G06N 3/04
2003/0174165 A1 *   9/2003   Barney ................. G06T 11/206
715/747

(Continued)

FOREIGN PATENT DOCUMENTS

CA   2834265         6/2014
CA   3039386 A1 *   5/2018   ......... G06F 17/2705

(Continued)

OTHER PUBLICATIONS

Jepsen; Tobias, How to do Deep Learning on Graphs with Graph Convolutional Networks, Sep. 18, 2018, Towards Data Science, (https://towardsdatascience.com/how-to-do-deep-learning-on-graphs-with-graph-convolutional-networks-7d2250723780) (Year: 2018).*

(Continued)

*Primary Examiner* — Paul S Schwarzenberg
(74) *Attorney, Agent, or Firm* — Fish & Richardson P.C.

(57) ABSTRACT

A graphical structure model trained by using labeled samples is obtained. The graphical structure model is defined based on an enterprise relationship network that includes nodes and edges. Each labeled sample includes a label indicating whether a corresponding node is a risky credit node. The graphical structure model is configured to iteratively calculate an embedding vector of at least one node in a hidden feature space based on an original feature of the at least one node and/or a feature of an edge associated with the at least one node. An embedding vector correspond- (Continued)

ing to a test-sample is calculated by using the graphical structure model. Credit risk analysis is performed on the test-sample. The credit risk analysis is performed based on a feature of the test-sample represented in the embedding vector. A node corresponding to the test-sample is labeled as a credit risk node.

23 Claims, 4 Drawing Sheets

(51) Int. Cl.
*G06K 9/62* (2022.01)
*G06N 7/00* (2006.01)

(56) References Cited

U.S. PATENT DOCUMENTS

| | | | |
|---|---|---|---|
| 2005/0182708 A1* | 8/2005 | Moudgal | G06Q 99/00 705/38 |
| 2005/0182709 A1 | 8/2005 | Moudgal | |
| 2009/0018940 A1 | 1/2009 | Wang et al. | |
| 2014/0317033 A1 | 10/2014 | Mojsilovic et al. | |
| 2014/0337972 A1 | 11/2014 | Foster et al. | |
| 2015/0082448 A1 | 3/2015 | Elovici et al. | |
| 2016/0035035 A1* | 2/2016 | Posch | G06Q 40/02 705/36 R |
| 2016/0042355 A1* | 2/2016 | Wang | G06Q 20/4014 705/39 |
| 2016/0300059 A1 | 10/2016 | Abrams et al. | |
| 2016/0328388 A1 | 11/2016 | Cao et al. | |
| 2017/0140382 A1 | 5/2017 | Chari et al. | |
| 2018/0053071 A1* | 2/2018 | Chen | G06N 20/10 |
| 2019/0080383 A1* | 3/2019 | Garcia Duran | G06N 3/0427 |
| 2019/0095806 A1* | 3/2019 | Martinez Canedo | G06Q 10/04 |
| 2019/0130406 A1* | 5/2019 | Marcjan | G06N 20/00 |
| 2019/0378051 A1* | 12/2019 | Widmann | G06N 3/0454 |
| 2020/0125820 A1* | 4/2020 | Kim | G06N 3/08 |
| 2020/0202219 A1 | 6/2020 | Song et al. | |
| 2022/0114661 A1* | 4/2022 | Sarshogh | G06Q 10/10 |

FOREIGN PATENT DOCUMENTS

| | | |
|---|---|---|
| CN | 104199832 | 12/2014 |
| CN | 104636912 | 5/2015 |
| CN | 104778605 | 7/2015 |
| CN | 105005931 | 10/2015 |
| CN | 105335855 | 2/2016 |
| CN | 105389732 | 3/2016 |
| CN | 105556552 | 5/2016 |
| CN | 105719033 | 6/2016 |
| CN | 105931046 | 9/2016 |
| CN | 106097090 | 11/2016 |
| CN | 106327340 | 1/2017 |
| CN | 106372938 | 2/2017 |
| CN | 106469376 | 3/2017 |
| CN | 106547838 | 3/2017 |
| CN | 106548302 | 3/2017 |
| CN | 106611137 | 5/2017 |
| CN | 107133865 | 9/2017 |
| CN | 107256465 | 10/2017 |
| CN | 107305611 | 10/2017 |
| CN | 107392456 | 11/2017 |
| TW | I466706 | 1/2015 |
| TW | 201626300 | 7/2016 |

OTHER PUBLICATIONS

Hamilton et al., Representation Learning on Graphs: Methods and Applications v3, Apr. 10, 2018, Department of Computer Science, Stanford University, IEEE Data Engineering Bulletin, pp. 1-24 (https://doi.org/10.48550/arXiv.1709.05584) (Year: 2018).*
U.S. Appl. No. 16/805,387, filed Feb. 28, 2020, Song et al.
U.S. Appl. No. 16/809,308, filed Mar. 4, 2020, Song et al.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in PCT Appln. No. PCT/CN2018/110730, dated Jan. 9, 2019, 11 pages (with machine translation).
International Search Report and Written Opinion in PCT Appln. No. PCT/CN2018/112345, dated Jan. 30, 2019, 12 pages (with machine translation).
International Preliminary Report on Patentability in International Application No. PCT/CN2018/110730, dated Jun. 16, 2020, 8 pages (with partial English translation).
International Preliminary Report on Patentability in International Application No. PCT/CN2018/112345, dated Jun. 16, 2020, 8 pages (with partial English translation).
Extended European Search Report in Application No. 18888001.7, dated Jul. 15, 2020, 8 pages.
Extended European Search Report in Application No. 18887759.1, dated Oct. 19, 2020, 8 pages.
Hamilton et al., "Representation Learning on Graphs: Methods and Applications", Department of Computer Science, 2017, 23 pages.

* cited by examiner

GRAPHICAL STRUCTURE MODEL-BASED CREDIT RISK CONTROL

CROSS-REFERENCE TO RELATED APPLICATIONS

This application is a continuation of PCT Application No. PCT/CN2018/110730, filed on Oct. 18, 2018, which claims priority to Chinese Patent Application No. 201711349800.4, filed on Dec. 15, 2017, and each application is hereby incorporated by reference in its entirety.

TECHNICAL FIELD

The present specification relates to the field of computer software technologies, and in particular, to a graphical structure model-based method, apparatus, and device for credit risk control.

BACKGROUND

With rapid development of computer and Internet technologies, many services including credit services can be implemented online.

In some existing technologies, credit of Internet users is usually evaluated by collecting behavior data of the users, and then loans can be granted to or other forms of resources other than funds can be provided for the users based on the credit of the users. However, operating statuses and risks of small enterprises usually cannot be directly reflected in the Internet, and data of the small enterprises usually needs to be collected and reported by specialized institutions.

SUMMARY

Implementations of the present specification provide a graphical structure model-based method, apparatus, and device for credit risk control, to alleviate the following technical problem: an effective credit risk control solution is needed.

To alleviate the previous technical problem, the implementations of the present specification are implemented as follows:

An implementation of the present specification provides a graphical structure model-based method for credit risk control, including: obtaining a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; calculating an embedding vector corresponding to a sample to be tested by using the trained graphical structure model; and performing credit risk control on the sample to be tested based on the embedding vector corresponding to the sample to be tested, where the labeled sample is labeled whether a node corresponding to the labeled sample is a credit risk node.

An implementation of the present specification provides a graphical structure model-based apparatus for credit risk control, including: an acquisition module, configured to obtain a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; a calculation module, configured to calculate an embedding vector corresponding to a sample to be tested by using the trained graphical structure model; and a risk control module, configured to perform credit risk control on the sample to be tested based on the embedding vector corresponding to the sample to be tested, where the labeled sample is labeled whether a node corresponding to the labeled sample is a credit risk node.

An implementation of the present specification provides a graphical structure model-based device for credit risk control, including: at least one processor; and at least one memory, connected to and communicating with the at least one processor, where the at least one memory stores an instruction executable by the at least one processor, and when the instruction is executed by the at least one processor, the at least one processor is enabled to perform the following steps: obtaining a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; calculating an embedding vector corresponding to a sample to be tested by using the trained graphical structure model; and performing credit risk control on the sample to be tested based on the embedding vector corresponding to the sample to be tested, where the labeled sample is labeled whether a node corresponding to the labeled sample is a credit risk node.

The at least one technical solution used in the implementations of the present specification can achieve following beneficial effects: An embedding vector and/or a predicted probability corresponding to a node can be calculated by effectively integrating a structure feature, a node feature, and an edge feature of the enterprise relationship network, and then credit risk control can be effectively performed on the node based on the embedding vector and/or the predicted probability.

BRIEF DESCRIPTION OF DRAWINGS

To describe the technical solutions in the implementations of the present specification or in the existing technology more clearly, the following briefly describes the accompanying drawings needed for describing the implementations or the existing technology. Apparently, the accompanying drawings in the following description are merely some of the implementations described in the present specification. A person of ordinary skill in the art can further derive other drawings from these accompanying drawings without creative efforts.

DESCRIPTION OF IMPLEMENTATIONS

The implementations of the present specification provide a graphical structure model and a graphical structure model-based method, apparatus, and device for credit risk control.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some but not all of the implementations of the present application. All other implementations obtained by a person of ordinary skill in the art based on the implementations of the present specification without creative efforts shall fall within the protection scope of the present application.

As described in background, it is hard to evaluate credit of enterprises, especially small enterprises. The present disclosure attempts to evaluate credit of an enterprise or an account by using information about executives and legal persons of the enterprise and combining their surrounding network relationships to integrate complex network information including factors such as enterprises, executives, legal persons, civil servants, and accounts to perform risk control.

Figure 1:
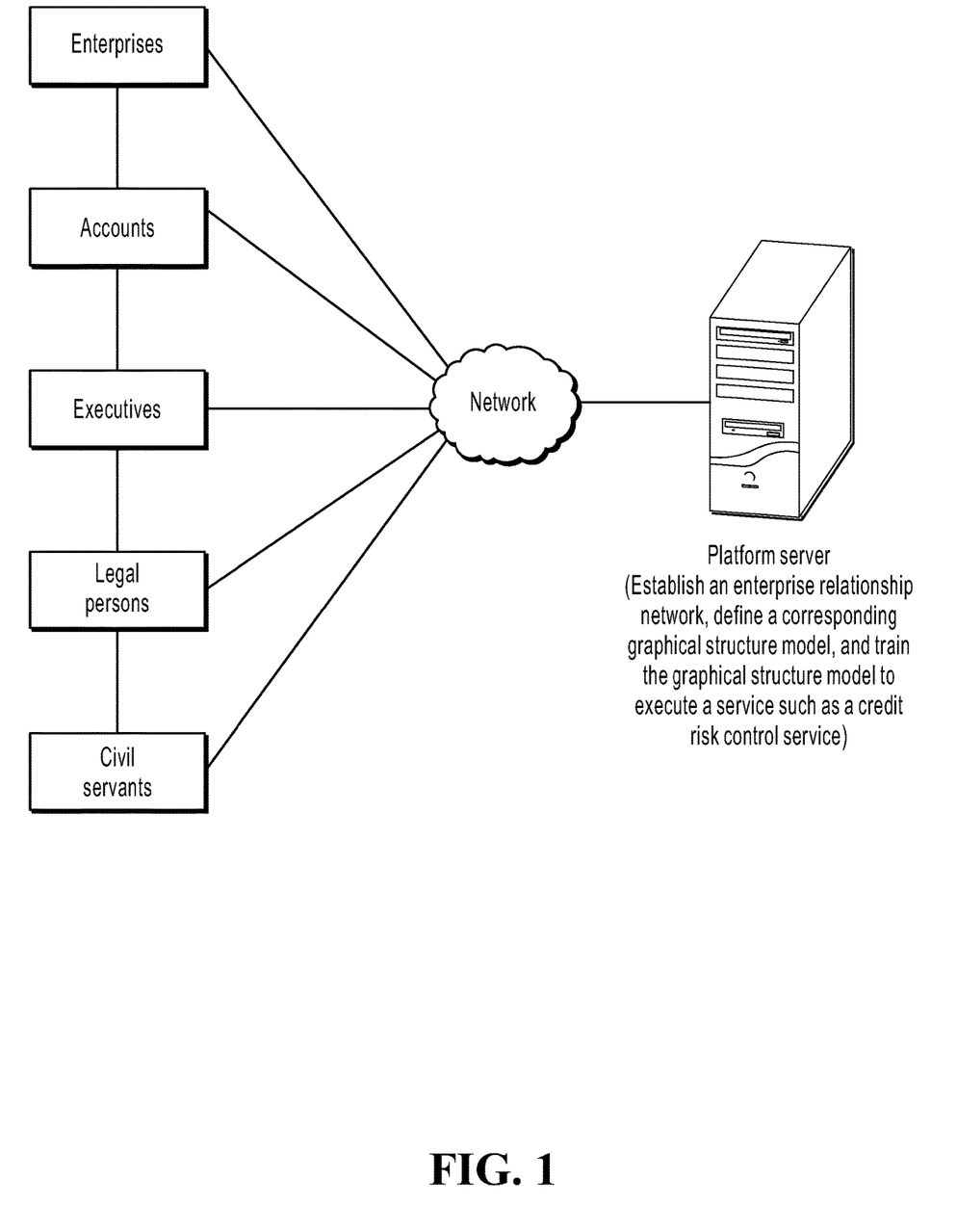
FIG. 1 is a schematic diagram illustrating an overall architecture in an actual application scenario, according to a solution of the present specification.

FIG. 1 is a schematic diagram illustrating an overall architecture in an actual application scenario, according to a solution of the present specification. The overall architecture mainly includes two parts: an enterprise and factors associated with the enterprise and a platform server. The associated factors include accounts, executives, legal persons, civil servants, etc. related to the enterprise. The platform server can include one or more devices. The platform server establishes an enterprise relationship network based on data related to the enterprise and the factors associated with the enterprise, defines a corresponding graphical structure model, and trains the graphical structure model for credit risk control.

The solutions of the present specification are described below in detail based on the architecture in FIG. 1.

Figure 2:
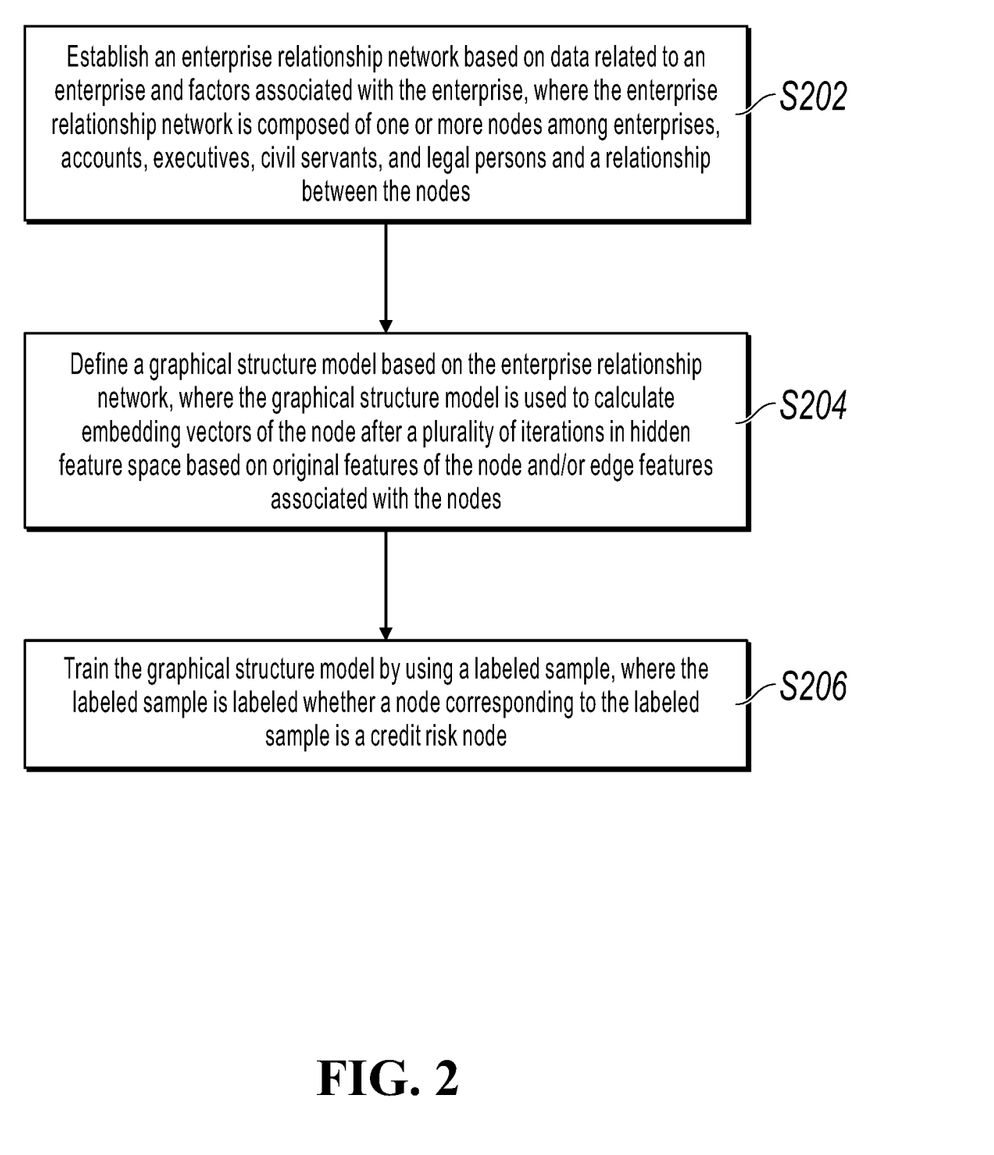
FIG. 2 is a schematic flowchart illustrating a graphical structure model training method, according to an implementation of the present specification.

FIG. 2 is a schematic flowchart illustrating a graphical structure model training method, according to an implementation of the present specification. The process in FIG. 2 includes the following steps:

S202. Establish an enterprise relationship network based on data related to an enterprise and factors associated with the enterprise, where the enterprise relationship network is composed of one or more nodes among enterprises, accounts, executives, civil servants, and legal persons and a relationship between the nodes.

Other nodes such as the account, the executive, the civil servant, and the legal person are directly or indirectly associated with the enterprise. For example, the other nodes include an account of the enterprise, accounts of some pivotal natural persons of the enterprise, the executive of the enterprise, a civil servant directly involved in a service of the enterprise, civil servants who are in a relatively close relationship with some pivotal natural persons of the enterprises, the legal person, a legal representative of the enterprise, or a representative of the legal person of the enterprise. For example, the account is a bank account, a third-party payment platform account, or a stock account.

In the enterprise relationship network, nodes such as the enterprise, the executive, the civil servant, and the legal person can be indicated by using corresponding identification information, for example, a name of the enterprise, an identity card number of the executive, a number of the civil servant, and an identity card number of the legal representative.

The enterprise relationship network can include one network or a combination of a plurality of heterogeneous networks, and can be established based on actual demands.

For example, the enterprise relationship network includes a shareholding relationship network between enterprises, a shareholding relationship network between a legal person and an enterprise, an employment relationship network between an executive and an enterprise, an association relationship network between an executive and a civil servant, an association relationship network between an executive and a civil servant, a belonging relationship network between an executive and an account, a family relationship network between accounts, a friend relationship network between accounts, a fund transfer network between accounts, and a labeling network between accounts. The labeling can indicate a label, remark information, etc.

In the present implementation of the present specification, the enterprise relationship network is graph data. The graph data is visual and can be easily processed by using a graph algorithm with high efficiency.

A node in the enterprise relationship network can include original features of the node. The original features can include a node type and respective features of different types of node. For example, features of an enterprise node include a ranking of the enterprise (for example, whether the enterprise is in the top 500 enterprises worldwide, whether the enterprise is in the top 100 enterprises nationwide, or whether the enterprise is in the top 100 enterprises in the industry), a type, registered capital, registration duration, a region, and financial report data. For example, features of an executive or civil servant node include age, gender, origin, educational background, and income of the executive or civil servant. For example, features of an account node include an asset amount in the account within a specific time period, an asset size, transaction data, transfer data, and the length of login/registration. For example, the transaction data includes detail or statistical data such as a transaction amount, the number of transactions, days of transaction, months of transaction, and the number of times different types of products are purchased, and purchase times of different types of products, and the transfer data includes detail or statistical data such as a transfer amount, the number of transfers, days of transfer, and months of transfer.

An edge in the enterprise relationship network can include a feature associated with nodes that are connected by the edge. The feature usually includes at least one of the following: shareholding relationship data, subordinate relationship data, interpersonal relationship data, service relationship data, and evaluation data. For a shareholding relationship between nodes, the edge feature is, for example, a shareholding proportion. For a subordinate relationship between nodes, the edge feature is, for example, a position of an executive in an enterprise. For an interpersonal relationship between nodes, the edge feature is, for example, a friend relationship or a past working relationship between an executive and a civil servant. For a service relationship between nodes, the edge feature is, for example, transfer data between accounts or a public service relationship between an enterprise and a civil servant. For evaluation between nodes, the edge feature is, for example, remark information between accounts.

S204. Define a graphical structure model based on the enterprise relationship network, where the graphical structure model is used to calculate embedding vectors of the node after a plurality of iterations in hidden feature space based on original features of the node and edge features associated with the nodes.

In the present implementation of the present specification, the original features of the nodes and the edge features in the enterprise relationship network can be integrated to describe feature space. Then, the graphical structure model is defined based on one or more feature space, a weight matrix to be determined in the feature space, and a specified nonlinear transformation function.

The weight matrix is used to perform linear transformation on the feature space, and the nonlinear transformation function is used to perform nonlinear transformation on the feature space. Therefore, the original feature of the node and the edge feature can be mapped to more complex hidden feature space by using the graphical structure model. The embedding vector reflects a feature of the corresponding node embedded in the final hidden feature space.

In a case of a plurality of iterations, the feature space can alternatively be defined based on a previous iteration result. Compared with the feature space defined based on the original feature of the node or the edge feature, the feature space can also be considered as hidden feature space.

Based on the previous analysis, an embedding vector of the node after each iteration in the hidden feature space can be calculated based on one or a combination of the following factors: original features of the node, edge features associated with the node and other nodes, and an embedding vector after a previous iteration or embedding vectors after a plurality of iterations of the node in the hidden feature space.

S206. Train the graphical structure model by using a labeled sample, where the labeled sample is labeled whether a node corresponding to the labeled sample is a credit risk node.

In the present implementation of the present specification, some existing samples can be labeled in advance with whether the samples are credit risk samples, to train the graphical structure model. Any sample can correspond to a node in the graphical structure model. A credit risk sample corresponds to a credit risk node. In a credit risk control scenario, a sample is usually a labeled enterprise or account.

In the following implementations, description is mainly provided by using an example, which is an enterprise. Credit risk of an enterprise usually can be labeled based on behavior data obtained after the enterprise uses a credit product. If a repayment is overdue for a long time, the enterprise can be considered as a credit risky enterprise and is labeled as such. In an actual service, labeling can be performed every day, or can be performed every a plurality of days, etc. Certainly, the labeling criterion of this example is merely an example, and is not intended to limit the present application. The labeling criterion can be defined based on actual demands.

In the present implementation of the present specification, training the graphical structure model is intended to determine an appropriate weight matrix, so that an embedding vector calculated based on the trained graphical structure model can indicate an attribute of a node corresponding to the embedding vector as true as possible, for example, indicate whether the node is a credit risk node.

According to the method in FIG. 2, an embedding vector and/or a predicted probability corresponding to a node can be calculated by effectively integrating a structure feature, a node feature, and an edge feature of the enterprise relationship network, and then credit risk control can be effectively performed on the node based on the embedding vector and/or the predicted probability.

Based on the method in FIG. 2, an implementation of the present specification further provides some specific implementations solutions and extension solutions of the method, to continue to describe the method.

In the present implementation of the present specification, the graphical structure model is further used to calculate a predicted probability of the node based on the embedding vector. In the credit risk control scenario, the predicted probability can indicate a probability that the node is a credit risk node.

In the present implementation of the present specification, the definition and the training process of the graphical structure model are visually defined by using an instance. Assuming that T represents the number of iterations to be performed, there are n nodes in total, $y_i$ represents a labeling result of the ith node (for example, a risk node is labeled 1, and a non-risk node is labeled 0), $F_i$ represents an original feature (with a feature dimension of f dimensions) of the ith node, $E_{ij}$ represents an edge feature (with a feature dimension of e dimensions) associated with the ith node and the jth node, $N_i$ represents a set of adjacent nodes of the ith node, the dimension needs to be finally embedded in the hidden feature space is h, and $H_i^t$ represents an embedding vector of the ith node in the tth iteration in the hidden feature space.

Assuming that an embedding vector of the node after the tth iteration in the hidden feature space is calculated based on the original feature of the node, edge features associated with the node and another node, and an embedding vector of the node after the (t−1)th iteration in the hidden feature space. Example definition of the graphical structure model is as follows:

"initialize $W_1$ (h*f dimensions), $W_2$ (h*e dimensions), $W_3$ (h*h dimensions), and $W_4$ (h*2 dimensions), for example, initialize by using standard Gaussian distribution
for t=1 to T://perform T iterations
for i=0 to n−1: //traverse n nodes $$H_i^t = \sigma\left(W_1 F_i + W_2 \sum_{j \in N_i} E_{ij} + W_3 \sum_{j \in N_i} \alpha_{ij} H_i^{t-1}\right);$$

//(equation 1) the process of the tth iteration of the ith node.
for i=0 to n−1: //traverse n nodes $$\text{pred}_i = \text{softmax}(W_4 * H_i^T);$$

//(equation 2) predicted probability of the ith node after T iterations
optimize arg $\min_{w_1, w_2, w_3, w_4} \Sigma_i \text{corss\_entrep}(\text{pred}_i, y_i)$;
//(equation 3) predicted probability of the ith node after T iterations, where σ represents a nonlinear transformation function (for example, functions like Relu, Sigmoid, Tan h, etc.), $W_1$, $W_2$, $W_3$ and $W_4$ represents weight matrices, $\alpha_{ij}$ represents a weight matrix (for example, a diagonal matrix) for the ith node and the jth node, $pred_i$ represents a predicted probability of the ith node after T iterations, and corss_entrep represents a function used to calculate cross entropy.

In the previous example, step S206 of training the graphical structure model by using a labeled sample can include: improving arg $\min_{w_1,w_2,w_3,w_4} \Sigma_i \text{corss\_entrep}(pred_i, y_i)$ by using a backward propagation algorithm and the labeled samples, to obtain optimal $W_1$, $W_2$, $W_3$, and $W_4$. An optimization objective here is set based on cross entropy of the predicted probability and a labeled result. It is worthwhile to note that the optimization objective can be set based on parameters, other than the cross entropy, that can measure consistency between the predicted probability and the labeling result. The optimization objective is to improve the consistency between the predicted probability and the labeling result.

The previous equations 1, 2, and 3 are merely examples, and are not the only solutions. For example, in equation 1, items of $F_i$, $E_{ij}$, and $H_i^{t-1}$ can be transformed by performing an operation such as multiplication, exponent, or logarithm, or two items can be combined, or one of the items can be deleted. For example, in equation 2, the function softmax can be replaced with other suitable normalization functions, etc.

Further, after the graphical structure model is trained, embedding vectors or predicted probabilities of existing samples and new samples can be calculated by using the trained graphical structure model through forward propagation. Then, the calculated embedding vector or predicted probability can be used for a sample-related service. For example, the embedding vector is used as an input to other models (for example, used as an input to other supervised, unsupervised, or reinforcement learning), or the embedding vector or the predicted probability is directly used to determine an attribute of the corresponding sample. Credit risk control is used as an example. When a predicted probability of a certain enterprise is greater than a specified threshold, the enterprise can be determined as a credit risky enterprise, and then risk control is performed.

Figure 3:
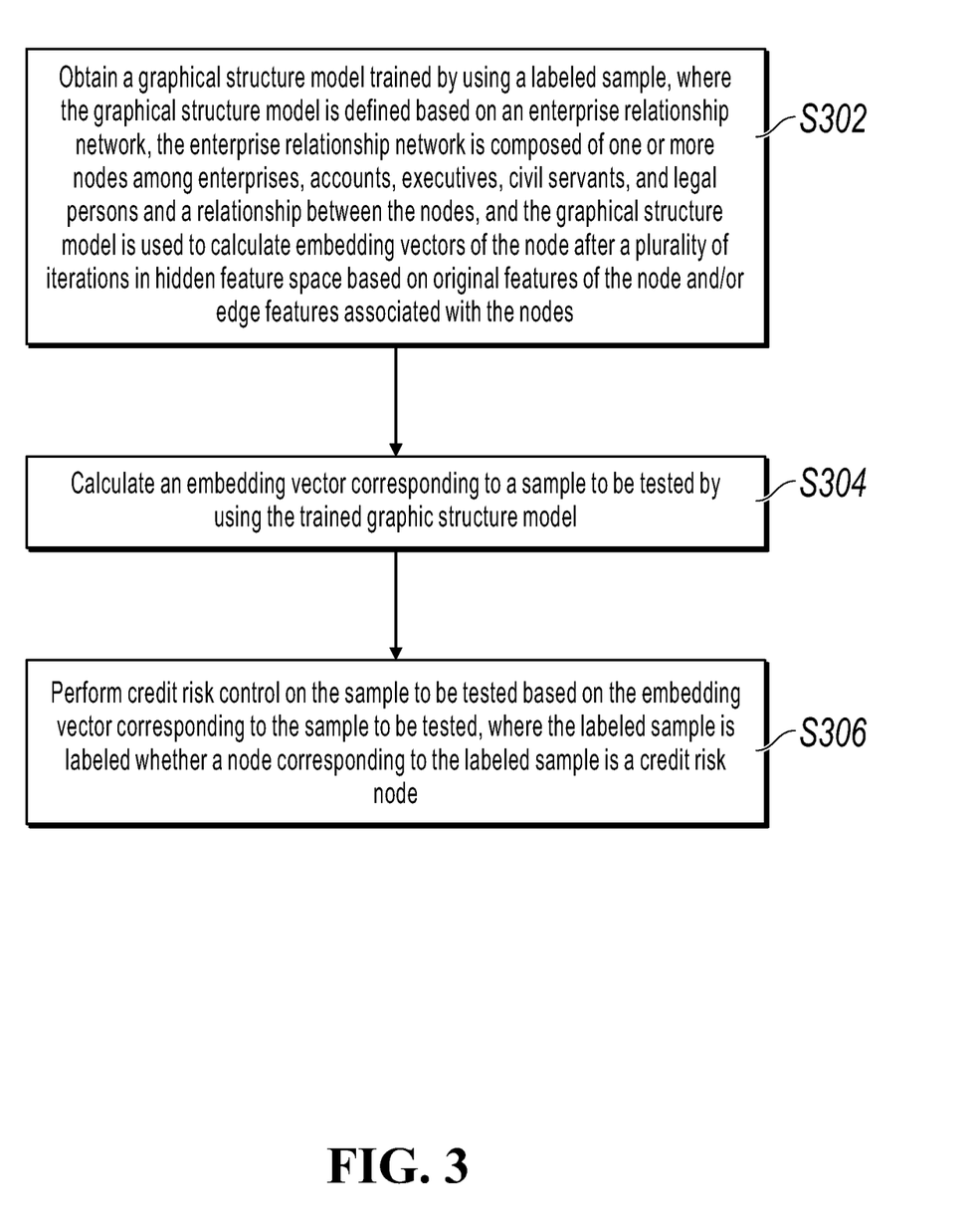
FIG. 3 is a schematic flowchart illustrating a graphical structure model-based method for credit risk control, according to an implementation of the present specification.

Based on the same idea, an implementation of the present specification further provides a graphical structure model-based method for credit risk control. FIG. 3 is a schematic flowchart illustrating the credit risk control method. The process in FIG. 3 includes the following steps:

S302. Obtain a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes.

In the present implementation of the present specification, the graphical structure model in FIG. 3 is trained by using the method in FIG. 2, and references can be made to the previous description of FIG. 2 to understand the method in FIG. 3.

S304. Calculate an embedding vector corresponding to a sample to be tested by using the trained graphical structure model.

S306. Perform credit risk control on the sample to be tested based on the embedding vector corresponding to the sample to be tested, where the labeled sample is labeled whether a node corresponding to the labeled sample is a credit risk node.

In actual application, the predicted probability can directly indicate a possibility that the enterprises involved in the samples are credit risky enterprises. Therefore, for step S306, a predicted probability corresponding to the sample to be tested can be further calculated by using the trained graphical structure model based on the embedding vector corresponding to the sample to be tested, and then credit risk control is performed on the sample to be tested based on the predicted probability corresponding to the sample to be tested. For example, assume that a certain sample to be tested is an enterprise. If a calculated predicted probability corresponding to the enterprise is greater than a specified threshold, it can be determined that the enterprise is a credit risky enterprise with relatively low credit, and then a loan request of the enterprise can be rejected or a loan amount granted to the enterprise can be adjusted.

Figure 4:
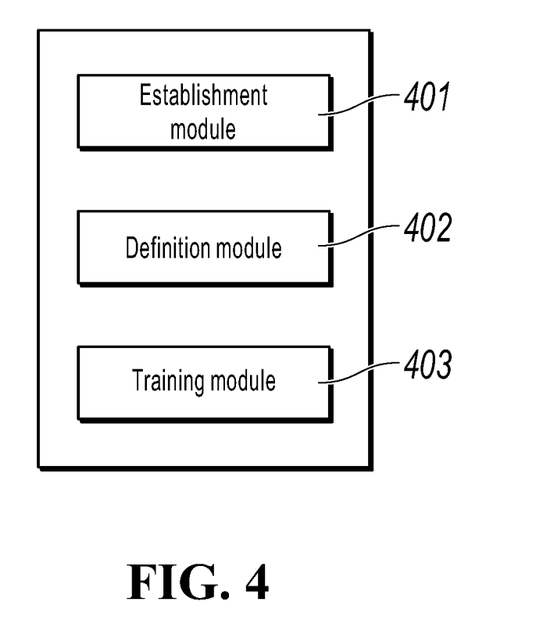
FIG. 4 is a schematic structural diagram of a graphical structure model training apparatus corresponding to FIG. 2, according to an implementation of the present specification.
Figure 5:
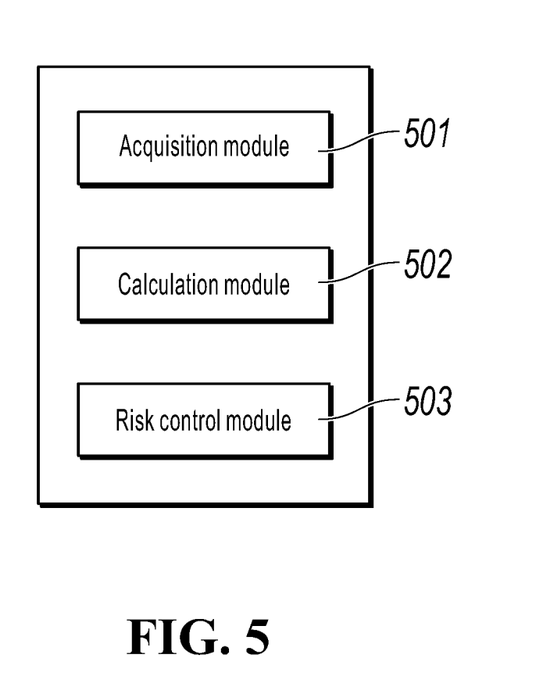
FIG. 5 is a schematic structural diagram of a graphical structure model-based apparatus for credit risk control corresponding to FIG. 3, according to an implementation of the present specification.

Based on the same idea, implementations of the present specification further provide apparatuses corresponding to the previously described methods, as shown in FIG. 4 and FIG. 5.

FIG. 4 is a schematic structural diagram of a graphical structure model training apparatus corresponding to FIG. 2, according to an implementation of the present specification. The apparatus includes: an establishment module 401, configured to establish an enterprise relationship network based on data related to an enterprise and factors associated with the enterprise, where the enterprise relationship network is composed of one or more nodes among enterprises, accounts, executives, civil servants, and legal persons and a relationship between the nodes; a definition module 402, configured to define a graphical structure model based on the enterprise relationship network, where the graphical structure model is used to calculate embedding vectors of the node after a plurality of iterations in hidden feature space based on original features of the node and edge features associated with the nodes; and a training module 403, configured to train the graphical structure model by using a labeled sample, where the labeled sample is labeled whether a node corresponding to the labeled sample is a credit risk node.

FIG. 5 is a schematic structural diagram of a graphical structure model-based apparatus for credit risk control corresponding to FIG. 3, according to an implementation of the present specification. The apparatus includes: an acquisition module 501, configured to obtain a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; a calculation module 502, configured to calculate an embedding vector corresponding to a sample to be tested by using the trained graphical structure model; and a risk control module 503, configured to perform credit risk control on the sample to be tested based on the embedding vector corresponding to the sample to be tested, where the labeled sample is labeled whether a node corresponding to the labeled sample is a credit risk node.

Optionally, the graphical structure model is further used to calculate a predicted probability of the node based on the embedding vector, where the predicted probability indicates a probability that the node is a credit risk node; and that the risk control module 503 is configured to perform risk control on the sample to be tested based on the embedding vector corresponding to the sample are to be tested includes: the risk control module 503 is configured to calculate a predicted probability corresponding to the sample to be tested by using the trained graphical structure model based on the embedding vector corresponding to the sample to be tested; and perform credit risk control on the sample to be tested based on the predicted probability corresponding to the sample to be tested.

Optionally, the enterprise relationship networks includes one or a combination of the following networks: a shareholding relationship network between enterprises, a shareholding relationship network between a legal person and an enterprise, an employment relationship network between an executive and an enterprise, an association relationship network between an executive and a civil servant, an association relationship network between an executive and a civil servant, a belonging relationship network between an executive and an account, a family relationship network between accounts, a friend relationship network between accounts, a fund transfer network between accounts, and a labeling network between accounts.

Optionally, the edge feature includes at least one type of the following data related to the edge-connected nodes: shareholding relationship data, subordinate relationship data, interpersonal relationship data, service relationship data, and evaluation data.

Optionally, an embedding vector of the node after the tth iteration in the hidden feature space is calculated based on the original feature of the node, edge features associated with the node and another node, and an embedding vector of the node after the (t−1)th iteration in the hidden feature space.

Optionally, the calculating embedding vectors of the node after a plurality of iterations in hidden feature space based on original features of the node and edge features associated with the nodes includes: calculating, by the calculation module 502, the embedding vectors of the node after the plurality of iterations in the hidden feature space based on the following equation:

$$H_i^t = \sigma\left(W_1 F_i + W_2 \sum_{j \in N_i} E_{ij} + W_3 \sum_{j \in N_i} \alpha_{ij} H_i^{t-1}\right),$$

where $H_i^t$ represents an embedding vector of the ith node after the tth iteration in the hidden feature space, $\sigma$ represents a nonlinear transformation function, $W_1$, $W_2$, and $W_3$ represent weight matrices, $F_i$ represents an original feature of the ith node, $E_{ij}$ represents edge features associated with the ith node and the jth node, $N_i$ represents a set of adjacent nodes of the ith node, and $\sigma_{ij}$ represents a weight matrix for the ith node and the jth node.

Optionally, the calculating a predicted probability of the node based on the embedding vector includes: calculating, by the calculation module 502, the predicted probability of the node based on the following equation:

$$pred_i = softmax(W_4 * H_i^T), \text{ where}$$

$pred_i$ represents a predicted probability of the ith node after T iterations, and $W_4$ represents a weight matrix.

Optionally, training the graphical structure model by using the labeled sample includes: training the graphic structure by using the labeled sample, to improve consistency between the predicted probability and a corresponding sample labeling result.

Optionally, training the graphical structure model by using the labeled sample includes: improving arg $\min_{w_1,w_2,w_3,w_4} \Sigma_t corss\_entrep(pred_t, y_t)$ by using a back propagation algorithm and the labeled samples, to obtain optimal $W_1$, $W_2$, $W_3$, and $W_4$, where corss_entrep represents a function used to calculate cross entropy.

Based on the same idea, an implementation of the present specification further provides a graphical structure model training device corresponding to FIG. 2. The device includes: at least one processor; and at least one memory, connected to and communicating with the at least one processor, where the at least one memory stores an instruction executable by the at least one processor, and when the instruction is executed by the at least one processor, the at least one processor is enabled to perform the following steps: establishing an enterprise relationship network based on data related to an enterprise and factors associated with the enterprise, where the enterprise relationship network is composed of one or more nodes among enterprises, accounts, executives, civil servants, and legal persons and a relationship between the nodes; defining a graphical structure model based on the enterprise relationship network, where the graphical structure model is used to calculate embedding vectors of the node after a plurality of iterations in hidden feature space based on original features of the node and edge features associated with the nodes; and training the graphical structure model by using a labeled sample, where the labeled sample is labeled whether a node corresponding to the labeled sample is a credit risk node.

Based on the same idea, an implementation of the present specification further provides a graphical structure model-based device for credit risk control corresponding to FIG. 3. The device includes: at least one processor; and at least one memory, connected to and communicating with the at least one processor, where the at least one memory stores an instruction executable by the at least one processor, and when the instruction is executed by the at least one processor, the at least one processor is enabled to perform the following steps: obtaining a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; calculating an embedding vector corresponding to a sample to be tested by using the trained graphical structure model; and performing credit risk control on the sample to be tested based on the embedding vector corresponding to the sample to be tested, where the labeled sample is labeled whether a node corresponding to the labeled sample is a credit risk node.

Based on the same idea, an implementation of the present specification further provides a nonvolatile computer storage medium corresponding to FIG. 2. The nonvolatile computer storage medium stores a computer executable instruction, and the computer executable instruction is used to perform the following steps: establishing an enterprise relationship network based on data related to an enterprise and factors associated with the enterprise, where the enterprise relationship network is composed of one or more nodes among enterprises, accounts, executives, civil servants, and legal persons and a relationship between the nodes; defining a graphical structure model based on the enterprise relationship network, where the graphical structure model is used to calculate embedding vectors of the node after a plurality of iterations in hidden feature space based on original features of the node and edge features associated with the nodes; and training the graphical structure model by using a labeled sample, where the labeled sample is labeled whether a node corresponding to the labeled sample is a credit risk node.

Based on the same idea, an implementation of the present specification further provides a nonvolatile computer storage medium corresponding to FIG. 3. The nonvolatile computer storage medium stores a computer executable instruction, and the computer executable instruction is used to perform the following steps: obtaining a graphical structure model trained by using a labeled sample, where the graphical structure model is defined based on an enterprise relationship network, the enterprise relationship network is composed of one or more nodes among enterprises, accounts, executives, civil servants, and legal persons and a relationship between the nodes, and the graphical structure model is used to calculate embedding vectors of the node after a plurality of iterations in hidden feature space based on original features of the node and/or edge features associated with the nodes; calculating an embedding vector corresponding to a sample to be tested by using the trained graphical structure model; and performing credit risk control on the sample to be tested based on the embedding vector corresponding to the sample to be tested, where the labeled sample is labeled whether a node corresponding to the labeled sample is a credit risk node.

Specific implementations of the present specification are described above. Other implementations are within the scope of the appended claims. In some cases, actions or steps described in the claims can be performed in an order different from that in the implementations, and desired results can be still achieved. In addition, the process described in the accompanying drawings does not necessarily require a particular sequence or consecutive sequence to achieve the desired results. In certain implementations, multi-task processing and parallel processing are also possible or can be advantageous.

The implementations in the present specification are described in a progressive way. For the same or similar parts between the implementations, references can be made to the implementations. Each implementation focuses on a difference from other implementations. In particular, implementations of the apparatus, device, and nonvolatile computer storage medium are basically similar to the method implementation, and therefore are described briefly. For related part, references can be made to partial description in the method implementation.

The apparatus, the device, and the nonvolatile computer storage medium provided in the implementations of the present specification correspond to the method. Therefore, the apparatus, device, and nonvolatile computer storage medium also have beneficial technical effects similar to those of the corresponding method. The beneficial technical effects of the method have been described in detail above, and therefore the beneficial technical effects corresponding to the apparatus, the device, and the nonvolatile computer storage medium are omitted here for simplicity.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, a computer-readable medium that stores computer readable program code (such as software or firmware) that can be executed by a microprocessor or a processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present specification is implemented, function of units can be implemented in one or more pieces of software and/or hardware.

A person skilled in the art should understand that an implementation of the present disclosure can be provided as a method, a system, or a computer program product. Therefore, the implementations of the present specification can use a form of hardware only implementations, software only implementations, or implementations with a combination of software and hardware. In addition, the implementations of the present disclosure can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the implementations of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

The present specification can be described in the general context of computer executable instructions executed by a computer, for example, a program module. The program module usually includes a routine, a program, an object, a component, a data structure, etc. for executing a specific task or implementing a specific abstract data type. The present specification can be practiced in distributed computing environments. In the distributed computing environments, tasks are executed by remote processing devices that are connected through a communications network. In the distributed computing environment, the program module can be located in both local and remote computer storage media including storage devices.

The implementations in the present specification are described in a progressive way. For the same or similar parts between the implementations, references can be made to the implementations. Each implementation focuses on a difference from other implementations. In particular, the system implementation is basically similar to the method implementation, and therefore is described briefly. For related parts, references can be made to partial description in the method implementation.

The previous descriptions are merely implementations of the present specification, and are not intended to limit the present application. For a person skilled in the art, the present application can have various modifications and changes. Any modifications, equivalent replacements, and improvements made within the spirit and the principle of the present application shall fall within the scope of the claims in the present application.

What is claimed is:

1. A computer-implemented method, comprising:
generating, by at least one computer based on an enterprise relationship network, a graphical structure model comprising a graph including nodes and edges, the nodes representing entities in the enterprise relationship network, the edges representing relationships between the entities;

training, by the at least one computer, the graphical structure model based on features of the nodes and edges in the graph using a set of labeled samples during an iterative training process that continues until a maximizing condition is satisfied, the iterative training process comprising:

calculating, by the at least one computer, an embedding vector of at least one node in a hidden feature space based on nonlinearly transforming a weighted combination of i) an original feature of the at least one node and/or ii) a sum of an edge feature of each edge associated with the at least one node, and iii) a weighted sum of an embedding vector from a previous iteration that is weighted using a matrix for the at least one node and each adjacent node, wherein the calculated embedding vector represents a hidden feature of the at least one node embedded in the hidden feature space; and maximizing, by the at least one computer, a consistency between a predicted result based on the embedding vector and the labeled sample corresponding to the at least one node, wherein each of the set of labeled samples comprises a label indicating whether a corresponding node in the graphical structure model is a risky credit node;

calculating, by the at least one computer using the trained graphical structure model, an embedding vector corresponding to a test-sample comprising a hidden feature of the test-sample in the hidden feature space; and performing by the at least one computer, credit risk control on the test-sample based on the embedding vector of the test-sample comprising the hidden feature of the test-sample in the hidden feature space, wherein performing the credit risk control comprises labeling a node corresponding to the test-sample as a risky credit node.

2. The computer-implemented method of claim 1, wherein the trained graphical structure model is further used to calculate a predicted probability of the at least one node based on the embedding vector of the at least one node, wherein the predicted probability represents a probability that the at least one node is a risky credit node; and determining that the test-sample represents the risky credit node comprises:

calculating, by the at least one computer using the trained graphical structure model, a predicted probability corresponding to the test-sample based on the embedding vector corresponding to the test-sample; and determining, by the at least one computer, that the test-sample represents the risky credit node based on the predicted probability corresponding to the test-sample.

3. The computer-implemented method of claim 1, wherein the entities in the enterprise relationship network comprise one or more of the following: an enterprise, an account, an executive, a civil servant, and a legal person, wherein the enterprise relationship network comprises one or more of the following networks: a shareholding relationship network between enterprises, a shareholding relationship network between a legal person and an enterprise, an employment relationship network between an executive and an enterprise, an association relationship network between an executive and a civil servant, an association relationship network between an executive and a civil servant, a belonging relationship network between an executive and an account, a family relationship network between accounts, a friend relationship network between accounts, a fund transfer network between accounts, and a labeling network between accounts.

4. The computer-implemented method of claim 1, wherein the edge feature of each edge associated with the at least one node comprises at least one of the following types of data: shareholding relationship data, subordinate relationship data, interpersonal relationship data, service relationship data, and evaluation data.

5. The computer-implemented method of claim 1, wherein the embedding vector of the at least one node after a tth iteration in the hidden feature space is calculated based on the original feature of the at least one node, the edge feature of each edge associated with the at least one node, and an embedding vector of the at least one node after a (t−1)th iteration in the hidden feature space.

6. The computer-implemented method of claim 2, wherein training the graphical structure model using the set of labeled samples comprises:

training, by the at least one computer, the graphical structure model using the set of labeled samples with a training objective that a consistency between the predicted probability and a corresponding sample label is maximized.

7. The computer-implemented method of claim 2, wherein calculating the predicted probability of the at least one node based on the embedding vector comprises:

calculating, by the at least one computer, the predicted probability of the at least one node based on the following equation:

$$pred_i = \text{softmax}(W_4 * H_i^T);$$

wherein $pred_i$, represents the predicted probability of the ith node after T iterations, and $W_4$ represents a weight matrix.

8. The computer-implemented method of claim 7, wherein training the graphical structure model using the set of labeled samples comprises:

optimizing, by at least one computer using a back-propagation algorithm and the set of labeled samples, $\arg\min_{w_1,w_2,w_3,w_4} \Sigma_i \text{corss\_entrep}(pred_i, y_i)$ to obtain optimal $W_1$, $W_2$, $W_3$, and $W_4$, wherein corss_entrep represents a function that is used to calculate cross entropy.

9. A non-transitory, computer-readable medium storing one or more instructions executable by a computer system to perform operations comprising:

generating based on an enterprise relationship network, a graphical structure model comprising a graph including nodes and edges, the nodes representing entities in the enterprise relationship network, the edges representing relationships between the entities;

training the graphical structure model based on features of the nodes and edges in the graph using a set of labeled samples during an iterative training process that continues until a maximizing condition is satisfied, the iterative training process comprising:

calculating an embedding vector of at least one node in a hidden feature space based on nonlinearly transforming a weighted combination of i) an original feature of the at least one node and/or ii) a sum of an edge feature of each edge associated with the at least one node, and iii) a weighted sum of an embedding vector from a previous iteration that is weighted using a matrix for the at least one node and each adjacent node, wherein the calculated embedding vector represents a hidden feature of the at least one node embedded in the hidden feature space; and maximizing a consistency between a predicted result based on the embedding vector and the labeled sample corresponding to the at least one node, wherein each of the set of labeled samples comprises a label indicating whether a corresponding node in the graphical structure model is a risky credit node;

calculating, using the trained graphical structure model, an embedding vector corresponding to a test-sample comprising a hidden feature of the test-sample in the hidden feature space; and performing credit risk control on the test-sample based on the embedding vector of the test-sample comprising the hidden feature of the test-sample in the hidden feature space, wherein performing the credit risk control comprises labeling a node corresponding to the test-sample as a risky credit node.

10. The non-transitory, computer-readable medium of claim 9, wherein the trained graphical structure model is further used to calculate a predicted probability of the at least one node based on the embedding vector of the at least one node, wherein the predicted probability represents a probability that the at least one node is a risky credit node; and determining that the test-sample represents the risky credit node comprises:
calculating, using the trained graphical structure model, a predicted probability corresponding to the test-sample based on the embedding vector corresponding to the test-sample; and
determining that the test-sample represents the risky credit node based on the predicted probability corresponding to the test-sample.

11. The non-transitory, computer-readable medium of claim 9, wherein the entities in the enterprise relationship network comprise one or more of the following: an enterprise, an account, an executive, a civil servant, and a legal person, wherein the enterprise relationship network comprises one or more of the following networks: a shareholding relationship network between enterprises, a shareholding relationship network between a legal person and an enterprise, an employment relationship network between an executive and an enterprise, an association relationship network between an executive and a civil servant, an association relationship network between an executive and a civil servant, a belonging relationship network between an executive and an account, a family relationship network between accounts, a friend relationship network between accounts, a fund transfer network between accounts, and a labeling network between accounts.

12. The non-transitory, computer-readable medium of claim 9, wherein the edge feature of each edge associated with the at least one node comprises at least one of the following types of data: shareholding relationship data, subordinate relationship data, interpersonal relationship data, service relationship data, and evaluation data.

13. The non-transitory, computer-readable medium of claim 9, wherein the embedding vector of the at least one node after a t th iteration in the hidden feature space is calculated based on the original feature of the at least one node, the edge feature of each edge associated with the at least one node, and an embedding vector of the at least one node after a (t−1)th iteration in the hidden feature space.

14. The non-transitory, computer-readable medium of claim 10, wherein training the graphical structure model using the set of labeled samples comprises:
training the graphical structure model using the set of labeled samples with a training objective that a consistency between the predicted probability and a corresponding sample label is maximized.

15. The non-transitory, computer-readable medium of claim 10, wherein calculating the predicted probability of the at least one node based on the embedding vector comprises:
calculating the predicted probability of the at least one node based on the following equation:

$$\text{pred}_i = \text{softmax}(W_4 * H_i^T);$$

wherein $\text{pred}_i$ represents the predicted probability of the ith node after T iterations, and $W_4$ represents a weight matrix.

16. The non-transitory, computer-readable medium of claim 15, wherein training the graphical structure model using the set of labeled samples comprises:
optimizing, using a back-propagation algorithm and the set of labeled samples, $\arg\min_{w_1,w_2,w_3,w_4} \Sigma_i \text{corss\_entrep}(\text{pred}_i, y_i)$, to obtain optimal $W_1$, $W_2$, $W_3$, and $W_4$, wherein corss_entrep represents a function that is used to calculate cross entropy.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, based on an enterprise relationship network, a graphical structure model comprising a graph including nodes and edges, the nodes representing entities in the enterprise relationship network, the edges representing relationships between the entities;
training the graphical structure model based on features of the nodes and edges in the graph using a set of labeled samples during an iterative training process that continues until a maximizing condition is satisfied, the iterative training process comprising:
calculating an embedding vector of at least one node in a hidden feature space based on nonlinearly transforming a weighted combination of i) an original feature of the at least one node and/or ii) a sum of an edge feature of each edge associated with the at least one node, and iii) a weighted sum of an embedding vector from a previous iteration that is weighted using a matrix for the at least one node and each adjacent node, wherein the calculated embedding vector represents a hidden feature of the at least one node embedded in the hidden feature space; and
maximizing a consistency between a predicted result based on the embedding vector and the labeled sample corresponding to the at least one node, wherein each of the set of labeled samples comprises a label indicating whether a corresponding node in the graphical structure model is a risky credit node;
calculating, using the trained graphical structure model, an embedding vector corresponding to a test-sample comprising a hidden feature of the test-sample in the hidden feature space; and
performing credit risk control on the test-sample based on the embedding vector of the test-sample comprising the hidden feature of the test-sample in the hidden feature space, wherein performing the credit risk control comprises labeling a node corresponding to the test-sample as a risky credit node.

18. The computer-implemented system of claim 17, wherein the trained graphical structure model is further used to calculate a predicted probability of the at least one node based on the embedding vector of the at least one node, wherein the predicted probability represents a probability that the at least one node is a risky credit node; and
determining that the test-sample represents the risky credit node comprises:
calculating, using the trained graphical structure model, a predicted probability corresponding to the test-sample based on the embedding vector corresponding to the test-sample; and
determining that the test-sample represents the risky credit node based on the predicted probability corresponding to the test-sample.

19. The computer-implemented method of claim 1, wherein performing the credit risk control on the test-sample further comprises:
transmitting, by the at least one computer, the embedding vector of the test-sample to other models including at least one of a supervised model, an unsupervised model, and a reinforcement learning model.

20. The computer-implemented method of claim 1, wherein calculating the embedding vector of the at least one node in the hidden feature space based on the original feature of the at least one node and/or the edge feature of each edge associated with the at least one node, and the embedding vector from the previous iteration comprises:
calculating the embedding vector of the at least one node based on $$H_i^t = \sigma\left(W_1 F_i + W_2 \sum_{j \in N_i} E_{ij} + W_3 \sum_{j \in N_i} \alpha_{ij} H_i^{t-1}\right),$$

$H_i^t$ represents the embedding vector of an ith node after a tth iteration in the hidden feature space, $\sigma$ represents a nonlinear transformation function, $W_1$, $W_2$, and $W_3$ represent weight matrices, $F_i$ represents an original feature of the ith node, $E_{ij}$ represents the edge feature of an edge between the ith node, and a jth node, $N_i$ represents a set of adjacent nodes of the ith node, and $\alpha_{ij}$ represents a weight matrix for the ith node and the jth node.

21. The non-transitory, computer-readable medium of claim 9, wherein calculating the embedding vector of the at least one node in the hidden feature space based on the original feature of the at least one node and/or the edge feature of each edge associated with the at least one node, and the embedding vector from the previous iteration comprises:
calculating the embedding vector of the at least one node based on $$H_i^t = \sigma\left(W_1 F_i + W_2 \sum_{j \in N_i} E_{ij} + W_3 \sum_{j \in N_i} \alpha_{ij} H_i^{t-1}\right),$$

$H_i^t$ represents an embedding vector of the ith node after the tth iteration in the hidden feature space, $\sigma$ represents a nonlinear transformation function, $W_1$, $W_2$, and $W_3$ represent weight matrices, $F_i$ represents an original feature of the ith node, $E_{ij}$ represents the edge of feature of an edge between the ith node and a jth node, $N_i$, represent a set of adjacent nodes of the ith node, and $\alpha_{ij}$ represents a weight matrix for the ith node and the jth node.

22. The computer-implemented system of claim 17, wherein calculating the embedding vector of the at least one node in the hidden feature space based on the original feature of the at least one node and/or the edge feature of each edge associated with the at least one node, and the embedding vector from the previous iteration comprises:
calculating the embedding vector of the at least one node based on $$H_i^t = \sigma\left(W_1 F_i + W_2 \sum_{j \in N_i} E_{ij} + W_3 \sum_{j \in N_i} \alpha_{ij} H_i^{t-1}\right),$$

$H_i^t$ represents an embedding vector of the ith node after the tth iteration in the hidden feature space, $\sigma$ represents a nonlinear transformation function, $W_1$, $W_2$, and $W_3$ represent weight matrices, $F_i$ represents an original feature of the ith node, $E_{ij}$ of adjacent nodes of the ith node, and a jth node, $N_i$ represents a set of adjacent nodes of the ith node, and $\alpha_{ij}$ represents a weight matrix for the ith node and the jth node.

23. The computer-implemented method of claim 1, wherein the original feature of the at least one node is weighted with a first weight matrix, the sum of the edge feature of each edge associated with the at least one node is weighted with a second weight matrix, and the weighted sum of the embedding vector from the previous iteration is weighted with a third weight matrix.

* * * * *